US007911644B2

United States Patent
Shiokawa

(10) Patent No.: US 7,911,644 B2
(45) Date of Patent: Mar. 22, 2011

(54) IMAGE FORMING APPARATUS AND REGISTRATION INSPECTION METHOD OF IMAGE FORMING APPARATUS

(75) Inventor: Hiroaki Shiokawa, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1126 days.

(21) Appl. No.: 11/606,986

(22) Filed: Dec. 1, 2006

(65) Prior Publication Data

US 2007/0195169 A1  Aug. 23, 2007

(30) Foreign Application Priority Data

Feb. 17, 2006 (JP) ................................ 2006-041037

(51) Int. Cl.
G06F 15/00 (2006.01)
(52) U.S. Cl. .......................... 358/1.9; 358/504; 358/518
(58) Field of Classification Search .................. 358/504, 358/1.9, 518; 382/162, 167
See application file for complete search history.

(56) References Cited

U.S. PATENT DOCUMENTS

| 6,198,549 B1* | 3/2001 | Decker et al. ................ 358/504 |
| 6,529,616 B1* | 3/2003 | Rasmussen et al. ......... 358/504 |
| 7,023,581 B2* | 4/2006 | Soler et al. .................... 358/504 |
| 2004/0175196 A1* | 9/2004 | Yamamoto et al. ............ 399/49 |
| 2004/0227966 A1* | 11/2004 | Lee ............................... 358/504 |

FOREIGN PATENT DOCUMENTS

| JP | 04-153053 A | 5/1992 |
| JP | A 11-311885 | 11/1999 |
| JP | A 2001-109218 | 4/2001 |
| JP | A 2004-90540 | 3/2004 |
| JP | 2005-303339 A | 10/2005 |
| JP | 2006-047934 A | 2/2006 |

OTHER PUBLICATIONS

Office Action issued in JP Application No. 2006-041037 on Nov. 9, 2010 (with English translation).

* cited by examiner

Primary Examiner — Kimberly A Williams
(74) Attorney, Agent, or Firm — Oliff & Berridge, PLC

(57) ABSTRACT

An image forming apparatus for forming a print image, which is composed of a first color image and a second color image, on a print medium, including: a test pattern printing portion that prints a test pattern including the first color and the second color; an image pickup portion that pictures an image of the test pattern printed by the test pattern printing portion; and a registration failure discrimination portion that discriminates a registration failure between the first color and the second color according to the pictured image of the test pattern pictured by the image pickup portion.

2 Claims, 8 Drawing Sheets

| CURRENT ATTACHED PLUS ONE COLOR | CYAN |
|---|---|

| AREA SIZE | A × A (DOT) |
|---|---|

| AREA 1 | BLACK |
|---|---|
| AREA 2 | PLUS ONE COLOR |
| AREA 3 | PLUS ONE COLOR |
| AREA 4 | BLACK |

FIG.3

IMAGE FORMING APPARATUS AND REGISTRATION INSPECTION METHOD OF IMAGE FORMING APPARATUS

BACKGROUND

The present invention relates to an image forming apparatus and a registration inspection method of the image forming apparatus, and more particularly to a technology, in an image forming apparatus for performing plus-one-color printing, to perform inspection of registration displacement and to correct the registration displacement if the registration displacement is detected.

SUMMARY

An aspect of the present invention provides an image forming apparatus for forming a print image, which is composed of a first color image and a second color image, on a print medium, including: a test pattern printing portion that prints a test pattern including the first color and the second color; an image pickup portion that pictures an image of the test pattern printed by the test pattern printing portion; and a registration failure discrimination portion that discriminates a registration failure between the first color and the second color according to the pictured image of the test pattern pictured by the image pickup portion.

BRIEF DESCRIPTION OF THE DRAWINGS

Embodiments of the present invention will be described in detail based on the following figures, wherein:

FIG. 3 is a diagram showing an example of test pattern definition information;

DETAILED DESCRIPTION

Embodiments of the image forming apparatus of the invention will be described with reference to the accompanying drawings.

(Control Configuration of Printer for Printing Plus-One-Color Image)

Figure 1:
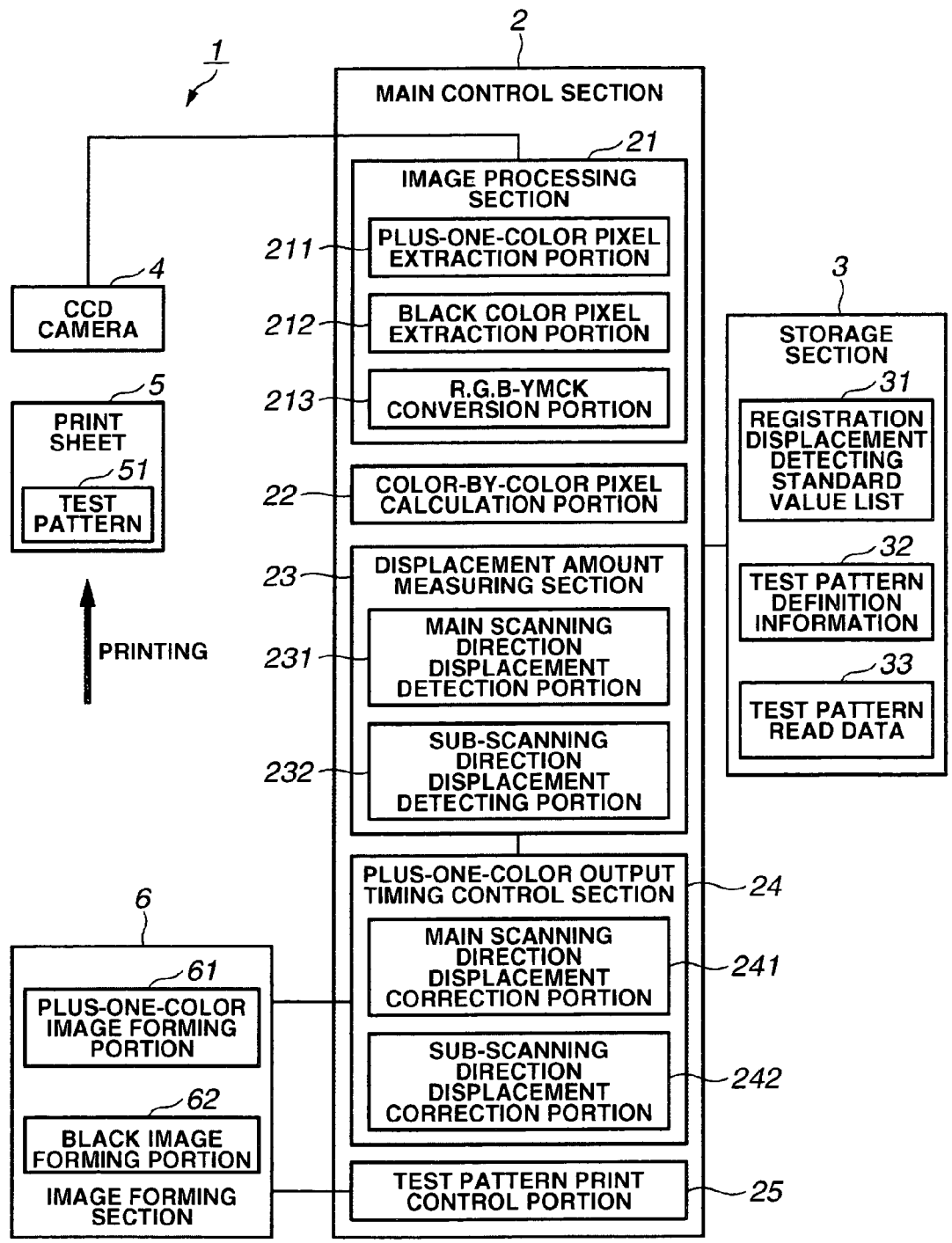
FIG. 1 is a block diagram showing control configuration related to registration inspection and registration correction of an image forming apparatus of the invention.

A control configuration of the image forming apparatus of the invention is shown in FIG. 1.

A printer 1 is comprised of a main control section 2 for controlling the printer 1 as a whole, a storage section 3, a CCD camera 4, and an image forming section 6, and the main control section 2 has as functional structures an image processing section 21, a color-by-color pixel calculation portion 22, a displacement amount measuring section 23, a plus one color output timing control section 24, and a test pattern print control portion 25.

The image processing section 21 performs color space conversion processing of a scanned image, which is based on the read signal of a test pattern 51 read at a prescribed resolution by the CCD camera 4, by a R. G. B-YMCK conversion portion 213 to develop to test pattern read data 33.

A plus-one-color pixel extraction portion 211 extracts pixel data, which agrees with color information of plus one color recorded in the test pattern definition information, from the test pattern read data 33.

A black color pixel extraction portion 212 extracts black pixels from the test pattern read data 33. The color-by-color pixel calculation portion 22 calculates a SUM value indicating a total of black pixels and a SUM value indicating a total of plus-one-color pixels on the basis of the pixel data extracted by the black color pixel extraction portion 212 and the plus-one-color pixel extraction portion 211.

The displacement amount measuring section 23 has a main scanning direction displacement detecting portion 231 which detects in units of pixels of read data a registration displacement amount in the main scanning direction of the plus-one-color registration with black registration determined as reference in the test pattern read data 33, and a sub-scanning direction displacement detecting portion 232 which detects a width of the registration displacement in the sub-scanning direction.

A main scanning direction displacement correction portion 241 calculates, for example, a registration correction amount based on the number of clocks from the displacement width of the plus-one-color registration indicated by the number of pixels of the test pattern read data 33 and detected by the main scanning direction displacement detecting portion 231, and controls the registration correction based on the calculated correction amount for the plus-one-color output timing control section 24.

A sub-scanning direction displacement correction portion 242 calculates the registration correction amount based on the number of clocks from the displacement width of the plus one color registration, which is detected by the sub-scanning direction displacement detection portion 232, indicated by the number of pixels of the test pattern read data 33, and performs registration correction based on the calculated correction amount for the plus-one-color output timing control section 24.

The plus one color output timing control section 24 controls in prescribed units of clocks the time of starting to record the image on a record medium in the main scanning direction and the sub-scanning direction for a black image forming portion 62 and a plus-one-color image forming portion 61.

The test pattern print control portion 25 rasterizes the black image and the plus-one-color image based in the test pattern definition information 32 recorded in the storage section 3, and performs print control for transferring the image of the test pattern 51 onto a print sheet 5 by the image forming section 6.

The image forming section 6 performs print processing by transferring to the print sheet 5 a rasterize image having a test image and a print image transferred to a developing device for a black color image and a plus-one-color image by control performed by the main control section 2 and the test pattern print control portion 25.

The plus-one-color image forming portion 61 rasterizes a plus-one-color image to be formed with color toner among images to be printed to form on the print sheet 5.

The black color image forming portion 62 rasterizes the image formable with the black color toner in the print image to form on the print sheet 5.

The CCD camera 4 performs the image read processing of the test pattern 51 printed on the print sheet 5 and outputs the read signal to the main control section 2.

As information related to the black color image, a buffer region for development of raster data of the plus one color, the registration inspection and the correction processing, the storage section 3 stores the test pattern read data 33, the definition information (e.g., definition information about the color used as the plus one color, a pattern size, and information related to the arrangement as shown in FIG. 3) required for rasterizing the image of the test pattern 51, namely the test pattern definition information 32, and a registration displacement detecting standard value list 31 for recording and managing information including the control parameter required for registration displacement inspection processing, the individual criteria values, and the unit conversion values when the number of pixels and the registration displacement correction amount required for correction of the registration displacement are calculated.

In FIG. 3, the color information on the plus one color is color identification information for specifying a print region of the plus one color based on the read image data about the test pattern 51 read by the CCD camera 4, and totaling distinctly the number of pixels in the specified region for the black image and the plus one color.

The area size is information recording the sizes of the individual areas in the main scanning direction and the sub-scanning direction determined by dividing the test pattern 51 into quarters.

The area-by-area color information is information used to measure a displacement amount and a displacement direction (either positive or negative in the main scanning direction and the sub-scanning direction) from the read data of the test pattern 51.

(Description of Test Pattern 51)

The test pattern 51 is an image of a lattice-shaped pattern including four squares having the same area obtained by dividing a square having its sides in the main scanning direction and the sub-scanning direction into quarters and alternately filling the divided squares in black and plus one color.

Figure 2:
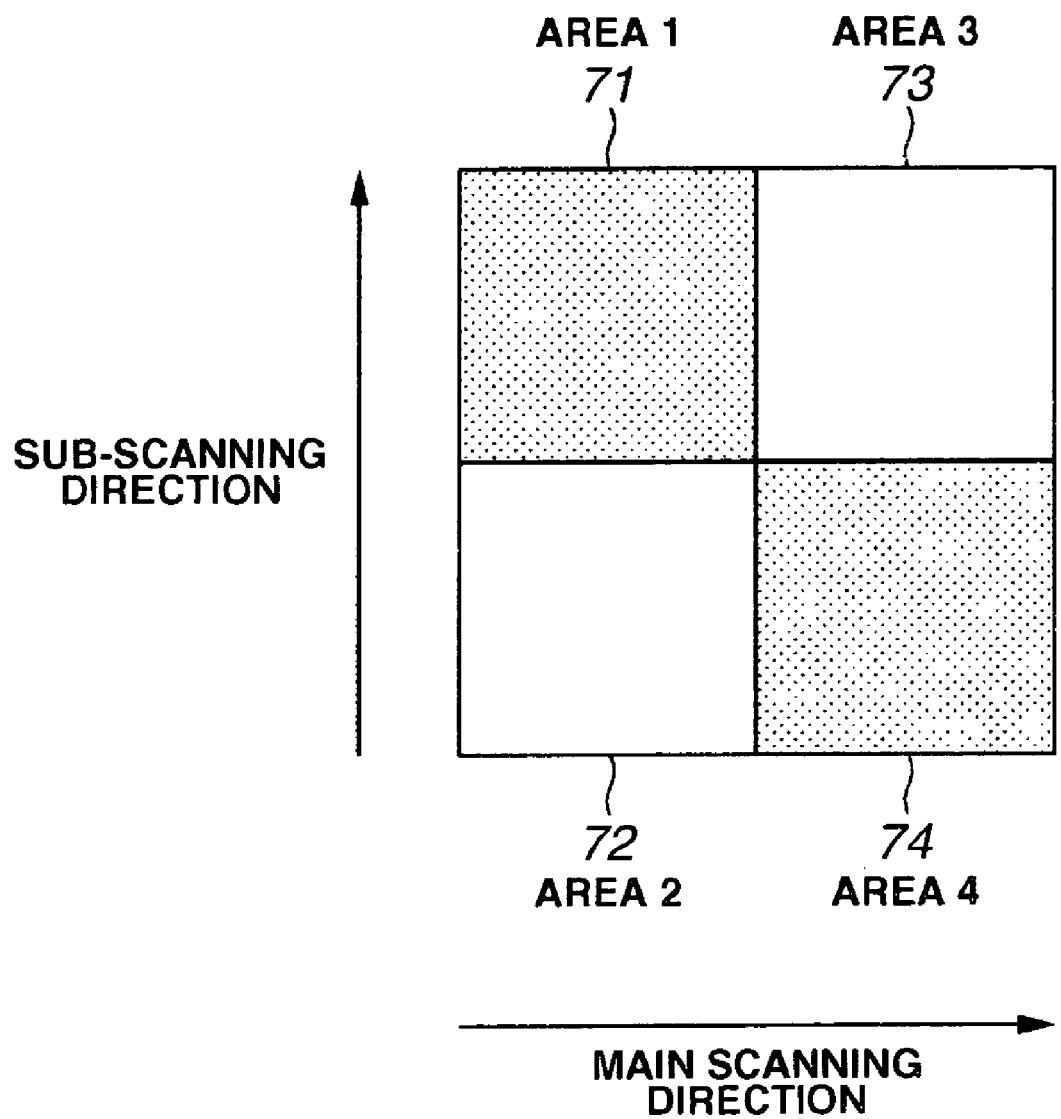
FIG. 2 is an image diagram showing an example of a test pattern.

It is an image configured so that if there is no registration displacement in the main scanning direction and the sub-scanning direction, the SUM value of the number of pixels in the print regions of the individual colors becomes 50% as shown in FIG. 2, and the lines of the individual leading edges in the main scanning direction and the sub-scanning direction are disposed on a straight line orthogonal to the individual scanning directions.

(Registration Displacement in Main Scanning Direction)

Figure 4A:
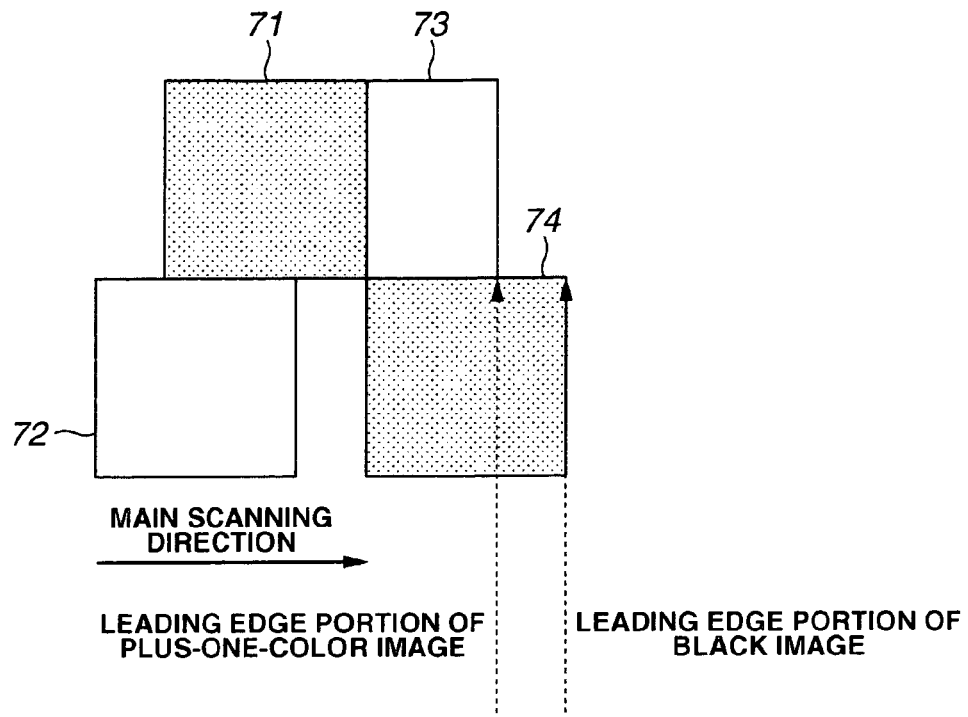
FIG. 4A and FIG. 4B are diagrams showing examples of scanned images of test patterns in a case where registration displacement has occurred in a main scanning direction of a plus-one-color image forming section.
Figure 4B:
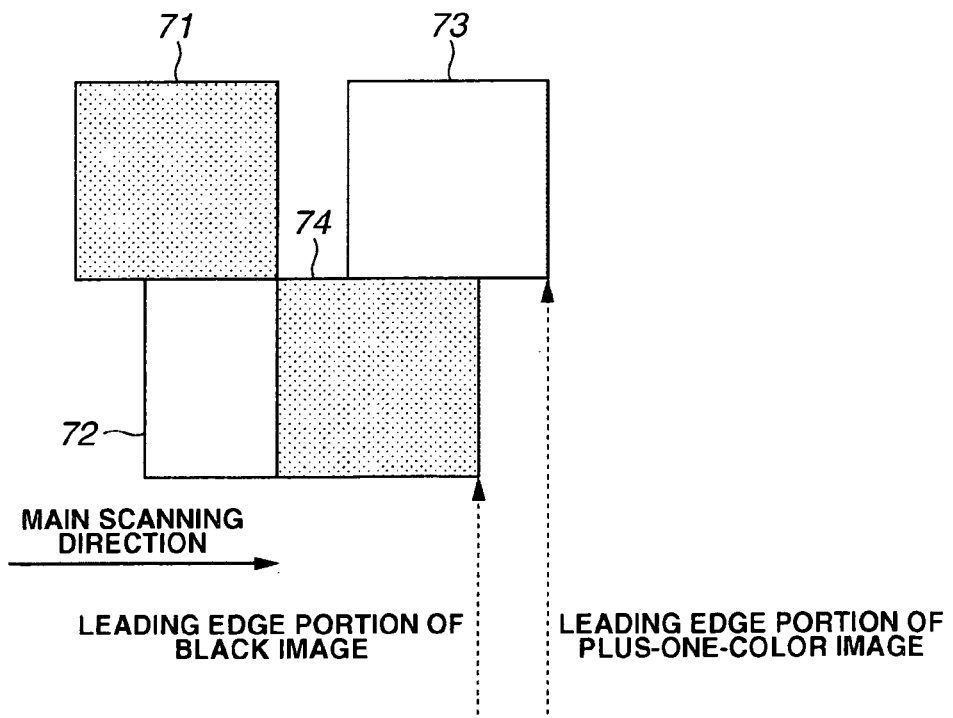

As an example that registration displacement has occurred in the main scanning direction, an area 2 and an area 4 are overlapped partially if the displacement occurs in the positive direction of the main scanning direction, and an area 1 and an area 3 are overlapped partially if the displacement occurs in the negative direction of the main scanning direction, when the leading edge portion of a black image is determined as reference as shown in FIG. 4A and FIG. 4B.

Thus, the plus-one-color image becomes a scanned image which is filled to form a black image for the overlapped portion due to the registration displacement, and the total value of the pixels of the plus one color in the scanned image data becomes low in comparison with that without the registration displacement.

Thus, the detection of a change in the total value is used to judge the presence or not of the registration displacement.

In a case where the occurrence of the registration displacement has been detected, the method for detection of the displacement width (displacement amount) based on the read data of the test pattern 51 calculates the registration displacement in the main scanning direction according to the value obtained by counting from the read data of the number of pixels present between the leading edge portion of the plus-one-color image and the leading edge portion of the black image which is used as reference.

(Registration Displacement in Sub-Scanning Direction)

Figure 5A:
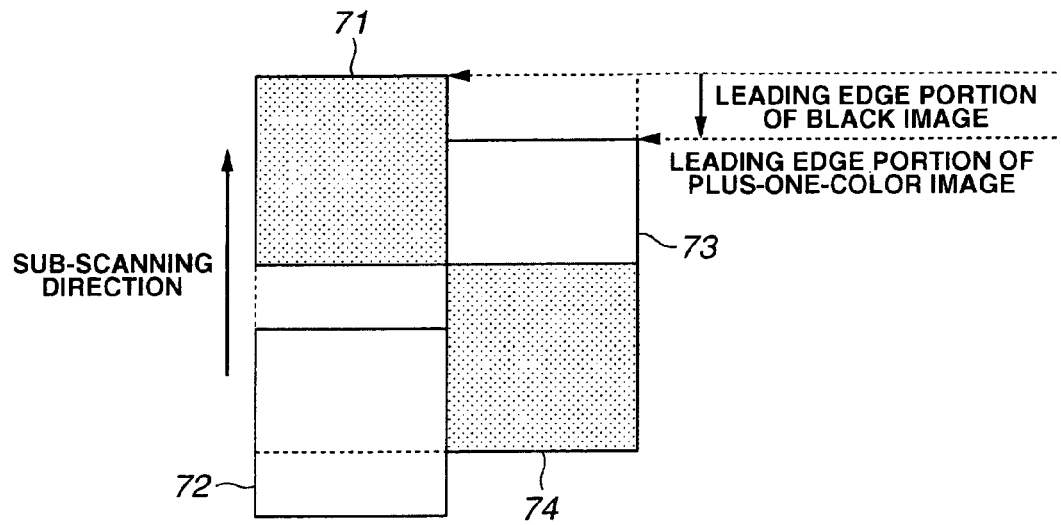
FIG. 5A and FIG. 5B are diagrams showing examples of scanned images of test patterns in a case where registration displacement has occurred in a sub-scanning direction of a plus-one-color image forming section.
Figure 5B:
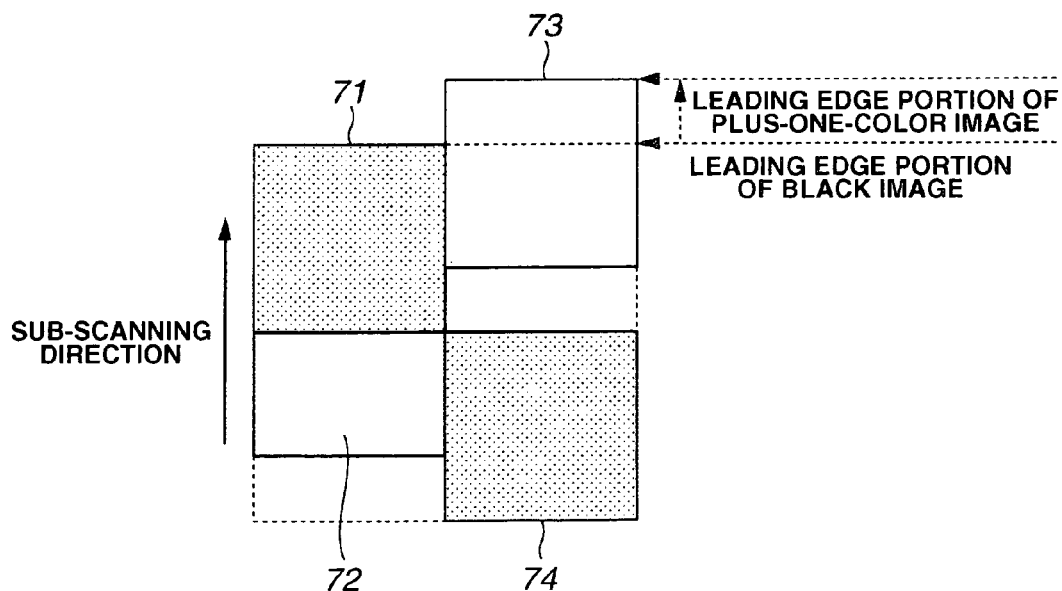

As an example that the registration displacement has occurred in the sub-scanning direction, the area 1 and the area 2 are partially overlapped if the plus-one-color registration is displaced in the positive direction with respect to the black image, and the area 3 and the area 4 are partially overlapped if the registration displacement occurs in the negative direction of the main scanning direction as shown in FIG. 5A and FIG. 5B.

(Registration Displacement in Main Scanning Direction and Sub-Scanning Direction)

Figure 6:
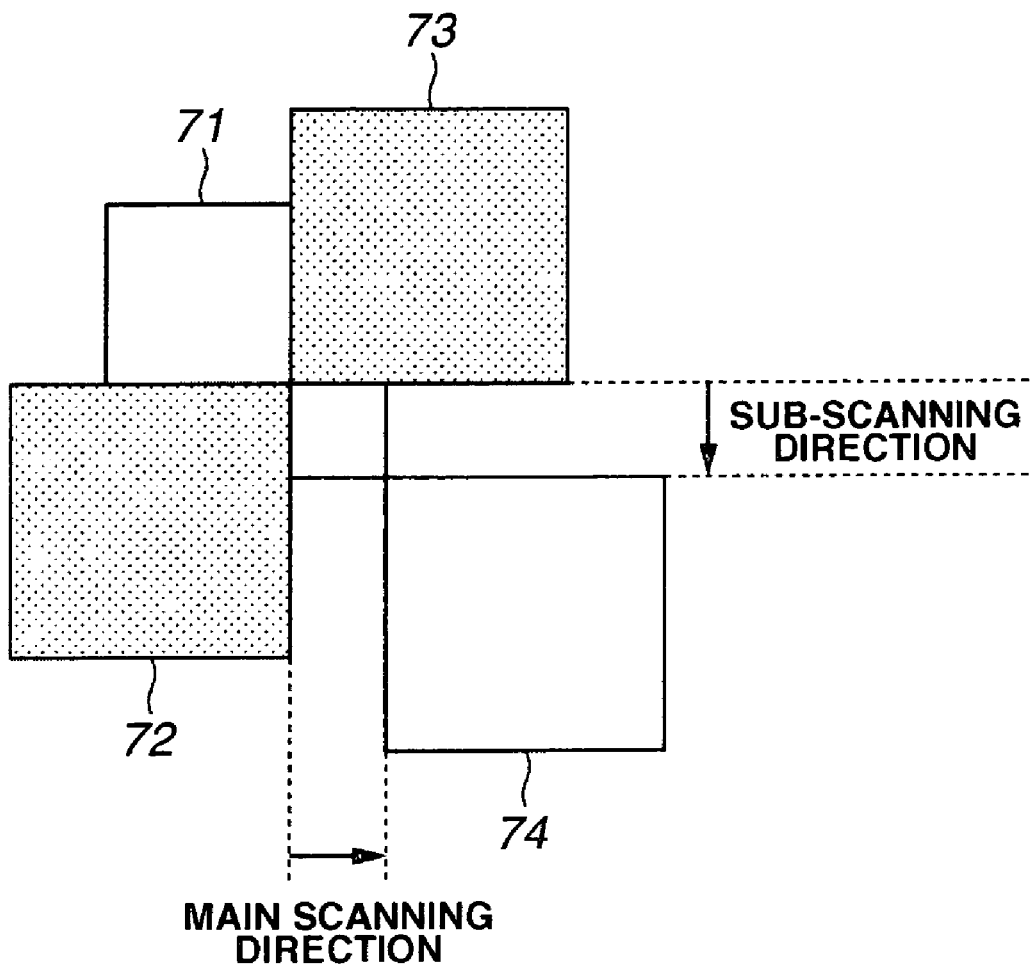
FIG. 6 is a diagram showing an example of a scanned image of a test pattern in a case where registration displacement has occurred in both a main scanning direction and a sub-scanning direction of a plus-one-color image forming section.

If the registration displacement occurs in both the main scanning direction and the sub-scanning direction, the example shown in FIG. 6 is, for example, a scanned image where the registration displacement has occurred in the positive direction of the main scanning direction and in the negative direction of the sub-scanning direction.

The size of the area which becomes the constituent unit of the test pattern 51 shown in FIG. 4, FIG. 5 and FIG. 6 is sufficiently longer than the maximum width of the registration displacement and defined by the length sufficiently satisfying the maximum displacement width in all the positive and negative directions of the main scanning direction and the sub-scanning direction.

(Inspection of Registration, and Correction Processing of the Registration in Case of Detection of Registration Displacement)

Then, the registration inspection processing in the printer shown in FIG. 1 and the operation of correction processing in case of detection of registration displacement in the registration inspection processing will be described with reference to the flow chart of FIG. 7.

Figure 7:
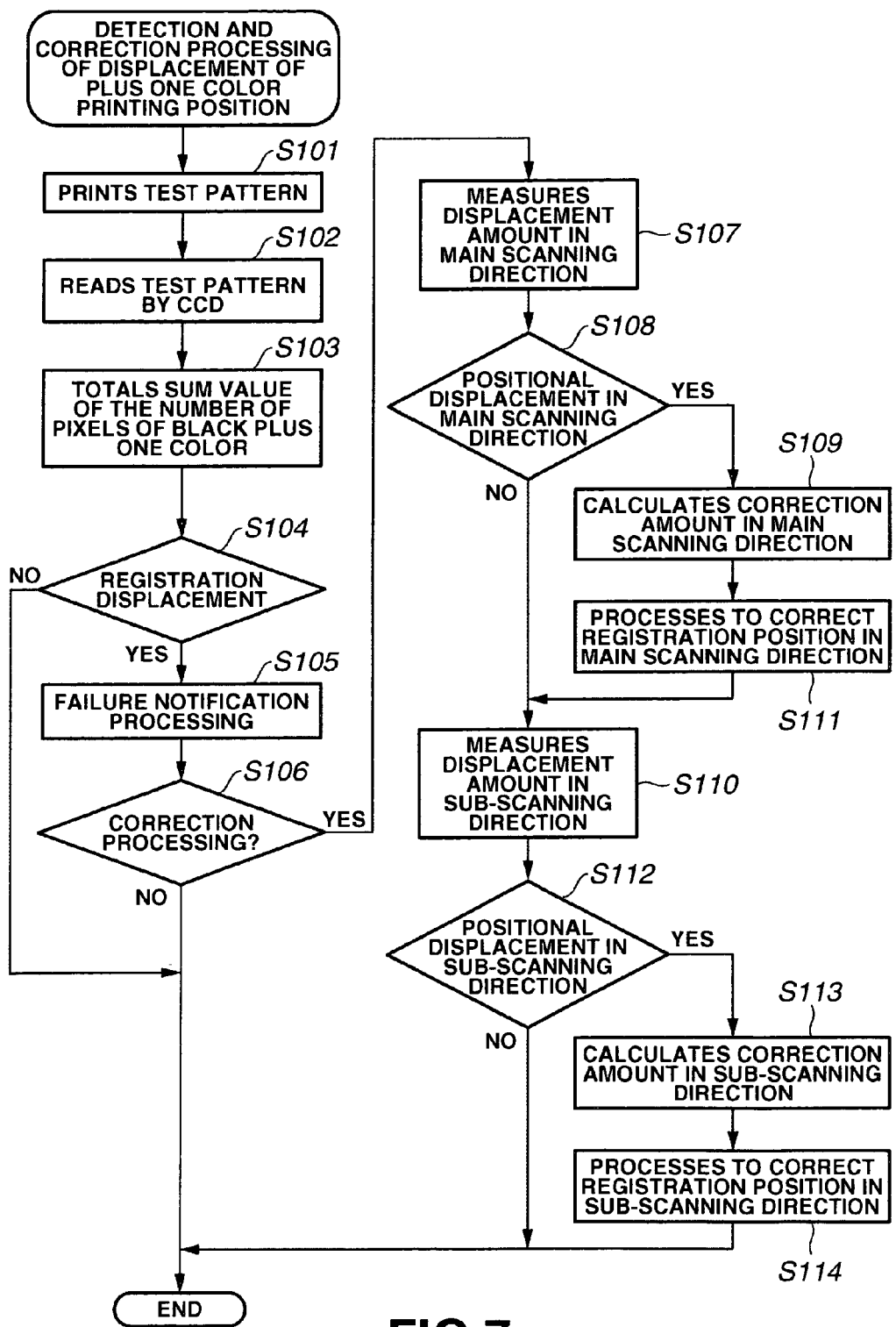
FIG. 7 is a flow chart showing operations for registration displacement detection and correction processing.

In FIG. 7, the printer 1 produces a raster image of the test pattern 51 in response to the test image print control (S101).

When the test pattern 51 has been printed, read processing of the test pattern 51 by a CCD is started, the read data is converted for color information by a R. G. B-YMCK conversion portion 213, and the pixels of the individual images formed by the plus-one-color image forming portion 61 and the black image forming portion 62 are extracted by the plus-one-color pixel extraction portion 211 and the black color pixel extraction portion 212 of the image processing section 21 and temporarily stored in a development region of the test pattern read data 33 of the storage section 3 (S102).

SUM values of the number of pixels of the individual colors are totaled by the color-by-color pixel totaling portion from the test pattern read data 33 which is temporarily stored in the storage section 3 by the test pattern read portion (S103).

The presence or not of registration displacement is judged according to the totaled SUM value (S104), and if there is no registration displacement (NO in S104), the inspection processing is terminated.

Meanwhile, if there is registration displacement (YES in S104), it is notified to, for example, an operation panel disposed on the printer 1 that the registration displacement has been detected as an inspection result, and a screen is displayed to let the operator select whether or not the registration correction processing is continued (S105).

Where it is operated to instruct the registration correction processing (S106), a displacement amount in the main scanning direction is measured by the main scanning direction displacement amount measuring portion (S107).

Where registration displacement in the main scanning direction is detected (YES in S108), the displacement amount in the main scanning direction is measured by the main scanning direction displacement amount measuring portion (S109), and a displacement correction amount in the main scanning direction is calculated based on the displacement amount measured by the main scanning direction displacement correction portion 241, and registration correction control is performed to the plus-one-color image forming portion 61 (S111).

Meanwhile, if registration displacement in the main scanning direction is not detected (NO in S108), or if the displacement amount correction processing in the main scanning direction is completed, the displacement amount in the sub-scanning direction is measured by the sub-scanning direction displacement detecting portion 232 (S110).

If the registration displacement in the sub-scanning direction is detected (YES in S112), the displacement correction amount in the sub-scanning direction is calculated by the sub-scanning direction displacement correction portion (S113), and the registration correction control is performed to the plus-one-color image forming portion 61 (S114).

After the first correction processing is completed (NO in S112, and the processing in S114 is completed), re-inspection for the success or not of the correction processing may be performed back in step S101.

If the registration displacement is detected by the processing in step S104 (YES in S104), the registration correction processing in step S107 and later may be performed without condition.

(Modified Example of Test Pattern 51)

The test pattern 51 in the embodiment described above is an example of a square having its sides in the main scanning direction and the sub-scanning direction and divided into quarters. But, it is not limited to the test pattern 51 shown in the above embodiment. In another case having a leading edge portion in both the main scanning direction and the sub-scanning direction and not having registration displacement, if a ratio of SUM values of pixels of the individual colors becomes 1:1, and an overlapped region is produced and registration displacement occurs in either the main scanning direction or the sub-scanning direction or in both the directions, it is appropriate when the SUM value of the read number of pixels, and more particularly the SUM value of pixels of the highlight color changes smaller than the SUM value in a case where there is no registration displacement, and the displacement width of the registration displacement can be detected by a difference in position of the leading edge portion in the scanning direction that the registration displacement has occurred.

Figure 8:
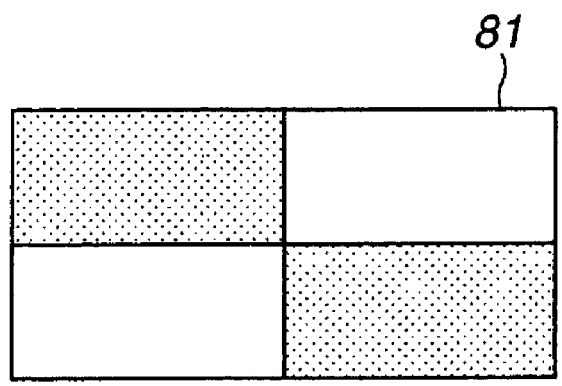
FIG. 8 is a diagram showing a modified example of test pattern images.
Figure 8:
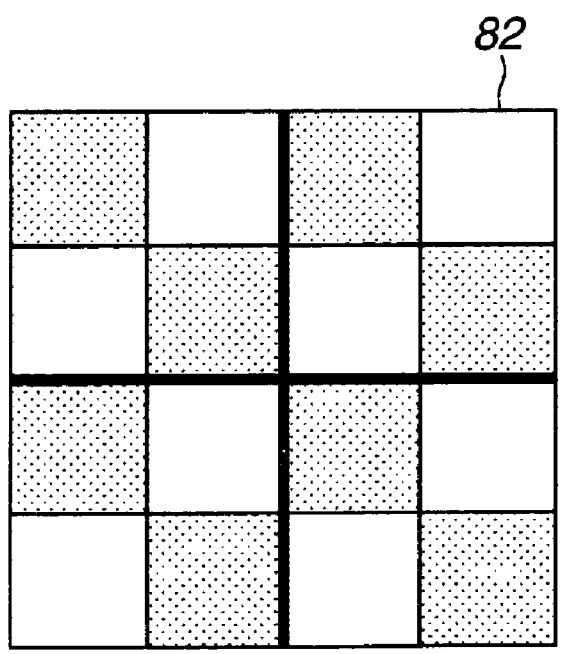

For example, it is naturally possible to have the test pattern 51 such as a rectangular divided into quarters as indicated by 81 in FIG. 8 or into 16 equal parts as indicated by 82 in FIG. 8.

(Structure of Modified Example Other Than Embodiment 1)

An example of the image forming apparatus for printing the plus one color was described above. But, in a case of having a plural-color image forming unit for forming two or more images in an overlaid state on a recording medium, the inspection of registration and the correction processing of the registration with respect to the image forming unit for each color shown in the above embodiment may be performed separately.

It was determined in the above embodiment that the registration displacement amount detection criteria were used for the black image forming unit, but if there is a plus-one-color or plural-color image forming unit, it may be configured to calculate the displacement amount and the correction amount with a prescribed color determined as reference.

In a case where there is a plural color image forming units, for example, the test pattern 51 shown in FIG. 2 of the above embodiment may be configured to print enumerated test patterns 51 of individual image forming units and to read collectively the enumerated plural test patterns 51 by a single reading processing so as to perform the registration inspection processing of the individual test patterns 51 and the registration displacement correction processing.

The above embodiment is an example of a laser printer using the color toner for forming the plus-one-color image. In addition, it can also be applied to an ink jet printer having a unit of reading the test pattern 51 printed in color inks by a CCD and a unit of performing the registration correction.

The image forming apparatus and the registration inspection method of the image forming apparatus of the invention can be used for an image forming apparatus which detects registration displacement by reading the test pattern and corrects it.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

What is claimed is:

1. An image forming apparatus for forming a print image, which is composed of a first color image and a second color image, on a print medium, comprising:

a test pattern printing portion that prints a test pattern including the first color and the second color, the test pattern being formed of a lattice-shaped pattern such that the first color and the second color have a same prescribed area when the first color and the second color do not have a registration failure in both of a main scanning direction and a sub-scanning direction that vertically intersects the main scanning direction;

an image pickup portion that scans an image of the test pattern printed by the test pattern printing portion;

a registration failure discrimination portion that judges a registration failure when the first color and the second color do not have the same prescribed area in the scanned image of the test pattern scanned by the image pickup portion;

a displacement amount detecting portion that detects each of a first displacement amount in the main scanning direction of the scanned image, and a second displacement amount in the sub-scanning direction of the scanned image, when the registration failure discrimination portion judges the registration failure; and a correction portion that performs registration correction in the main scanning direction of the first color and the second color according to the first displacement amount detected by the displacement amount detecting portion and performs registration correction in the sub-scanning direction of the first color and the second color according to the second displacement amount detected by the displacement amount detecting portion.

2. A registration inspection method of an image forming apparatus that forms a print image, which is composed of a first color image and a second color image, on a print medium, comprising:

printing, by a test pattern printing portion, a test pattern including the first color and the second color, the test pattern being formed of a lattice-shaped pattern such that the first color and the second color have a same prescribed area when the first color and the second color do not have a registration failure in both of a main scanning direction and a sub-scanning direction that vertically intersects the main scanning direction, scanning, by an image pickup portion, an image of the printed test pattern printed by the test pattern printing portion, judging, by a registration failure discrimination portion, a failure of registration when the first color and the second color do not have the same prescribed area in the scanned image of the test pattern scanned by the image pickup portion, detecting, by a displacement amount detecting portion, each of a first displacement amount in the main scanning direction of the scanned image, and a second displacement amount in the sub-scanning direction of the scanned image, when the registration failure discrimination portion judges the failure of registration, and performing, by a correction portion, registration correction in the main scanning direction of the first color and the second color according to the first displacement amount detected by the displacement amount detecting portion, and registration correction in the sub-scanning direction of the first color and the second color according to the second displacement amount detected by the displacement amount detecting portion.

* * * * *